United States Patent [19]
Yamaguchi

[11] Patent Number: 5,262,971
[45] Date of Patent: Nov. 16, 1993

[54] BIDIRECTIONAL SHIFTER

[75] Inventor: Akira Yamaguchi, Yokohama, Japan

[73] Assignee: Kabushiki Kaisha Toshiba, Kanagawa, Japan

[21] Appl. No.: 778,912

[22] PCT Filed: May 13, 1991

[86] PCT No.: PCT/JP91/00629

§ 371 Date: Dec. 30, 1991

§ 102(e) Date: Dec. 30, 1991

[30] Foreign Application Priority Data

May 15, 1990 [JP] Japan .................................. 2-122881

[51] Int. Cl.$^5$ .............................................. G06F 7/00
[52] U.S. Cl. .............................................. 364/715.08
[58] Field of Search .................................... 364/715.08

[56] References Cited

U.S. PATENT DOCUMENTS

| | | | |
|---|---|---|---|
| 4,472,788 | 9/1984 | Yamazaki | 364/715.08 |
| 4,583,197 | 4/1986 | Chappell | 364/715.08 |
| 4,665,538 | 5/1987 | Machida | 364/715.08 |
| 4,782,457 | 11/1988 | Cline | 364/715.08 |
| 4,829,460 | 5/1984 | Ito | 364/715.08 |
| 4,839,839 | 6/1989 | Tokumaru et al. | 364/715.08 |

Primary Examiner—David H. Malzahn
Attorney, Agent, or Firm—Finnegan, Henderson, Farabow, Garrett & Dunner

[57] ABSTRACT

A bidirectional shifter according to the present invention is characterized by comprising a barrel shifter (52) that is composed of an M × N matrix of selectors (11), M arranged in the column direction according to the amount of shift and N in the row direction according to the data length, and that is capable of performing a right (or left) shift according to data indicating the amount of right (or left) shift, and data right/left reversing means (52, 53) provided at the input and output stages of the barrel shifter, respectively, which selects input data according to a shift control signal. With this configuration, a barrel shifter capable of a right (or left) shift is able to shift data both right and left as required.

2 Claims, 15 Drawing Sheets

BIDIRECTIONAL SHIFTER

TECHNICAL FIELD

This invention relates to a bidirectional shifter capable of shifting data right and left, and more particularly to a bidirectional shifter used for microprocessor and signal processing LSI (such as a DSP i.e., a Digital Signal Processor).

BACKGROUND ART

Data shift, including cyclic shift, is indispensable to versatile signal processing techniques. To shift data, sequential shift registers are generally used. Since such shift registers take a long time to shift data, a barrel shifter has been proposed which uses a logic circuit for data shift.

Figure 1:
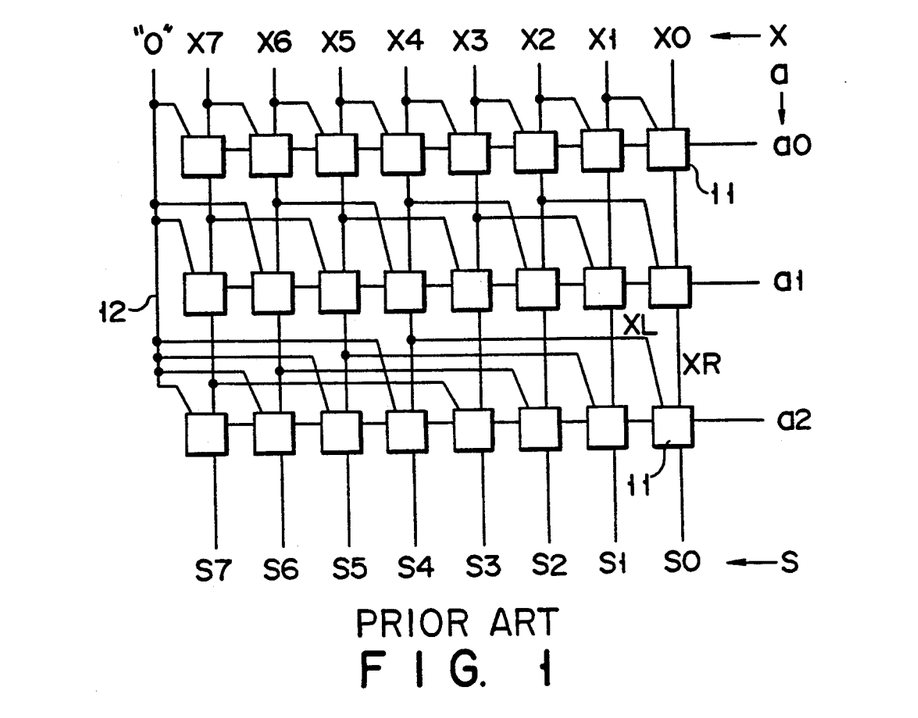
FIG. 1 is a block diagram of a conventional shifter.
Figure 2:
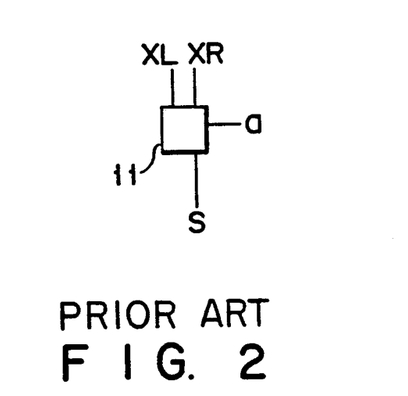
FIG. 2 is a block diagram of a portion of FIG. 1.
Figure 3:
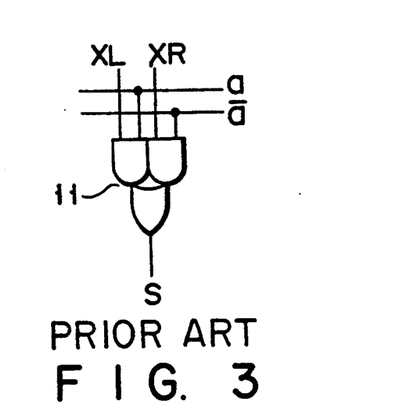
FIG. 3 is a circuit diagram of FIG. 2.

FIG. 1 shows a barrel shifter capable of shifting data right. FIG. 2 illustrates one of selectors 11 serving as basic units, in more detail. FIG. 3 is a circuit diagram of the selector of FIG. 2, where the left data XL or right data XR is selected, depending on a signal a (a, ā) and then supplied as an output S.

In FIG. 1, a right shift is performed on input data X (X7=a, X6=b, X5=c, ..., X1=g, X0=h) according to a given shift value ranging from 0 to 7 (a binary control signal a2, a1, a0). That is, a desired shift is carried out by setting a control signal (a2, a1, a0) to a different value for each row or stage, and then selecting either left or right data (XL, XR) as the input data to each stage according to the control signal. For example, to shift data right 5 bit positions, the control signal (a2, a1, a0) is set to (1, 0, 1). Then, the left input (XL) is selected by each selector 11 in the first row (the first stage) from the top of the figure to perform a right shift of 1 bit position. Similarly, in the second row (the second stage), the right input (XR) is selected to perform a right shift of 0 bit position, that is, to allow the data to pass through downward without any change. In the third row (the third stage), with a2=1, the left input (XL) is selected to make a right shift of 4 bit positions.

Figure 4:
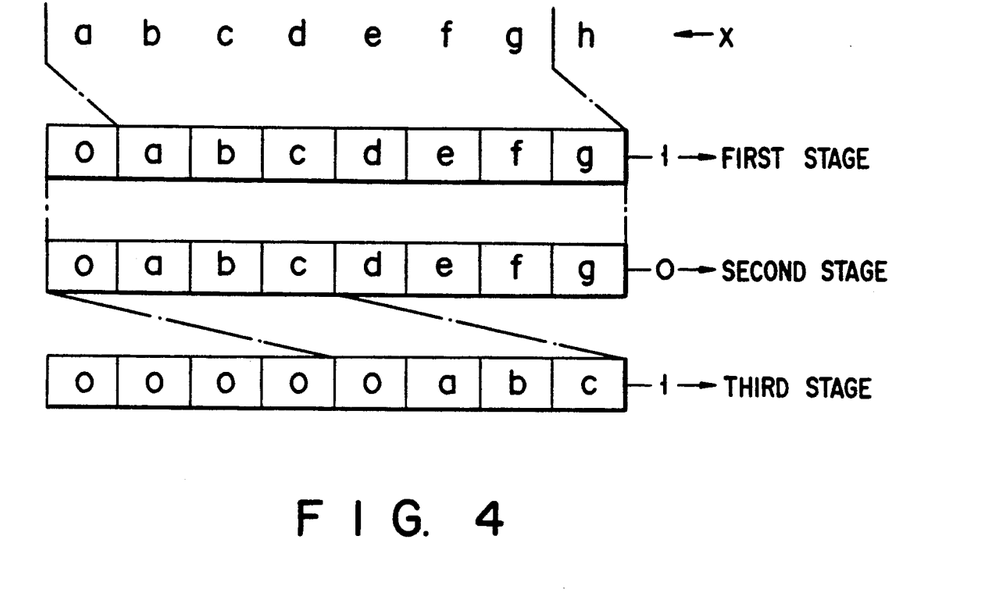
FIG. 4 is an explanatory diagram for the operation of FIG. 1.

Thus, by causing data to pass through the 3 stages of shift circuits, a right shift of 5 bit positions in total is carried out. This process is illustrated in FIG. 4. As seen from the figure, the input data X=a through h is shifted right 1 bit position at the first stage, and 4 bit positions at the third stage, resulting in a right shift of a total of 5 bit positions. In FIG. 1, numeral 12 indicates a 0-setting section that supplies a 0 to the unoccupied selectors after the shift.

Figure 5:
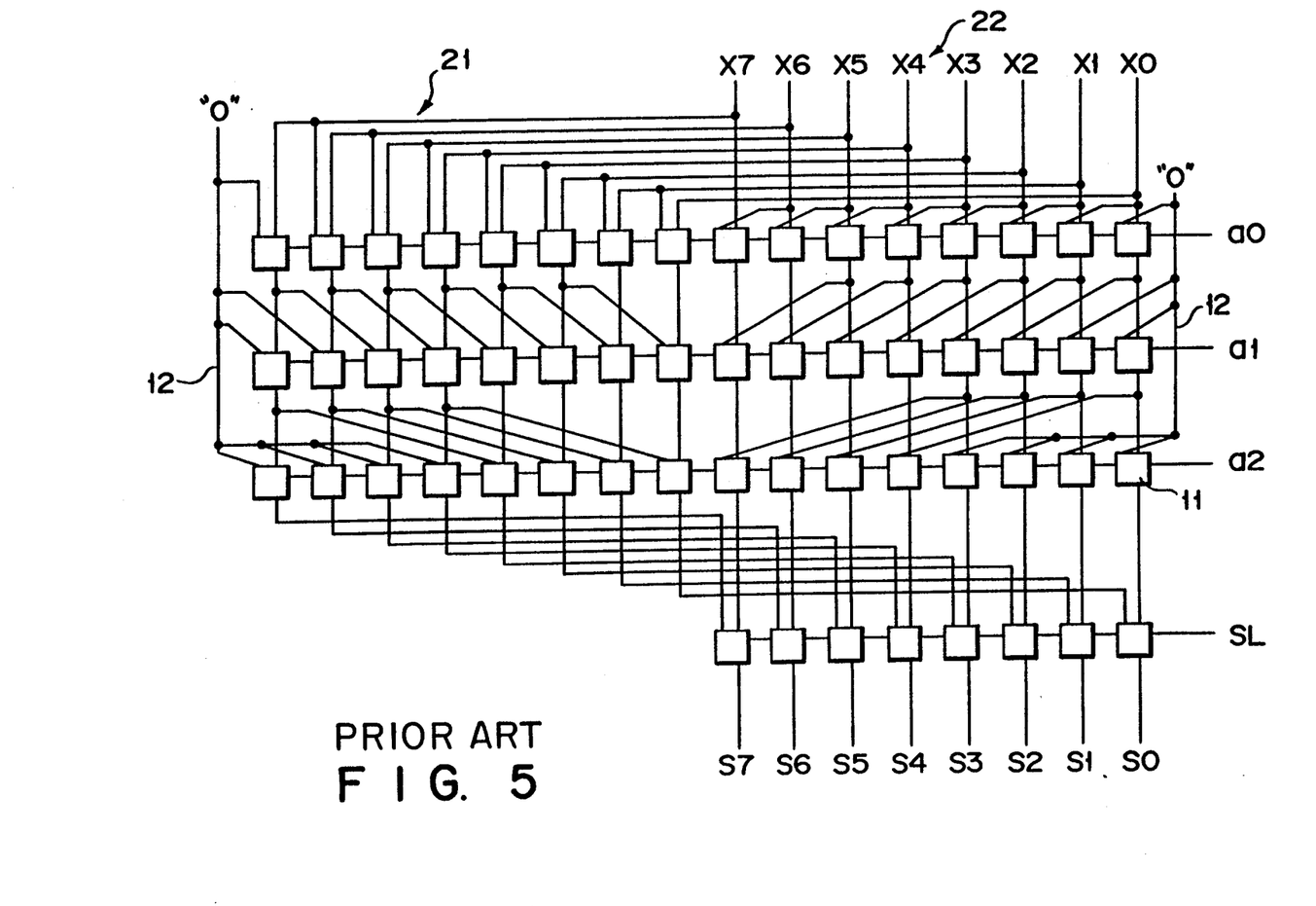
FIG. 5 is a block diagram for a conventional bidirectonal shifter.
Figure 6:
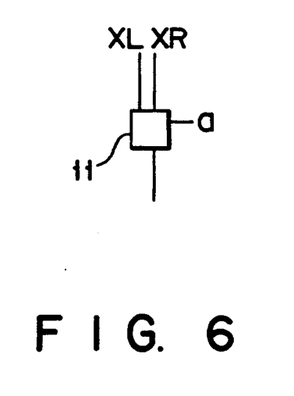
FIG. 6 is a block diagram of a portion of FIG. 5.
Figure 7:
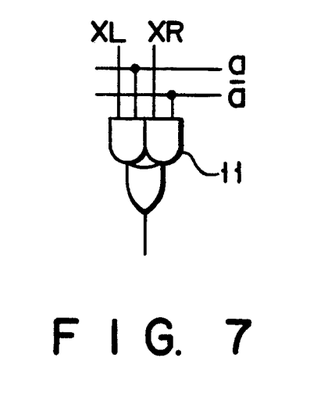
FIG. 7 is a circuit diagram of FIG. 6.
Figure 8:
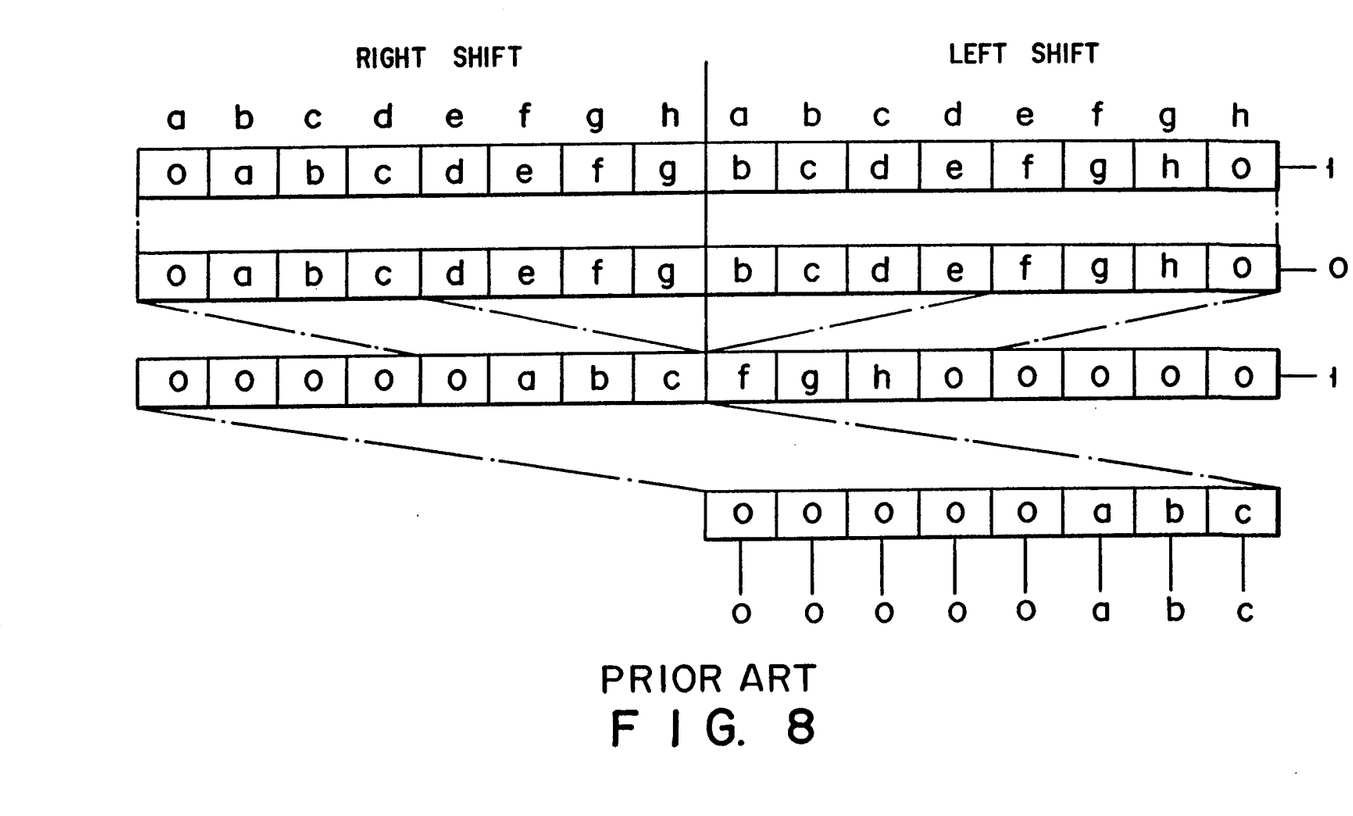
FIG. 8 is an explanatory diagram for the operation of FIG. 5.

FIG. 5 shows a conventional barrel shifter capable of performing a right and left shift, FIG. 6 is a detailed view of one of the selectors 11 serving as basic units, and FIG. 7 illustrates the circuit of FIG. 6 in more detail. In FIG. 5, among the rows where selectors are arranged in the horizontal direction, the upper three rows (three stages) from the top of the figure have a right shift circuit (indicated by numeral 21) and a left shift circuit (indicated numeral 22), which are located in parallel. A right or left shift is performed by shifting data right or left a desired number of bit positions according to the control signal a0 through a2, and then selecting either the right shift value or the left shift value, the output S7 through S0, according to the select signal SL. FIG. 8 illustrates how a right shift of 5 bit positions is performed.

Figure 9:
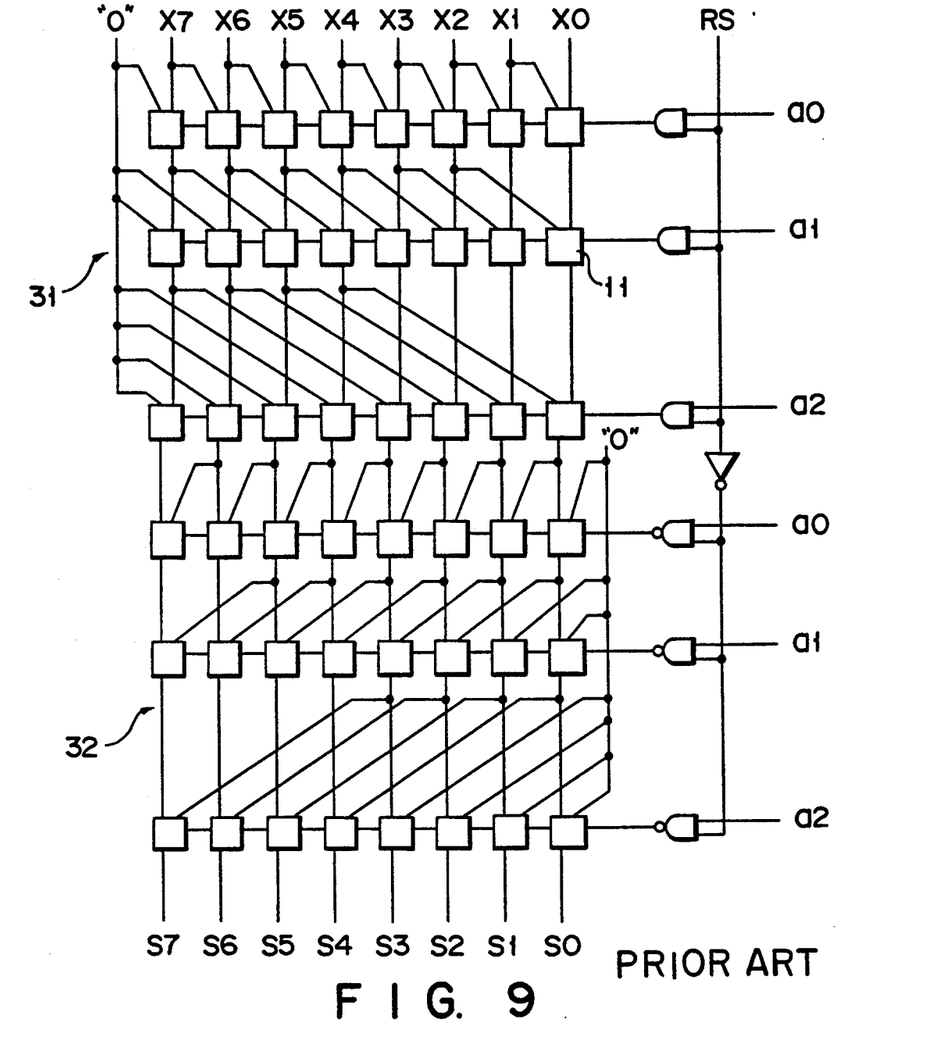
FIG. 9 a block diagram for another conventional bidirectional shifter.
Figure 10:
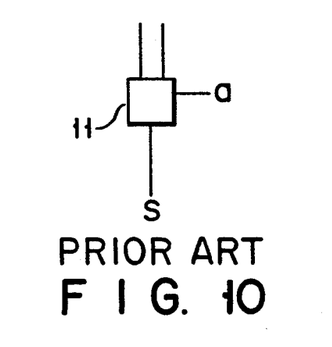
FIG. 10 is a block diagram of a portion of FIG. 9.
Figure 11:
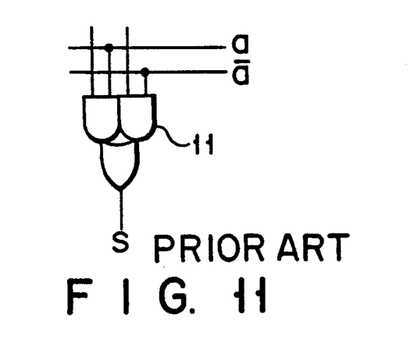
FIG. 11 is a circuit diagram of FIG. 10.

FIG. 9 shows another conventional bidirectional barrel shifter. FIG. 10 is a detailed view of one of the selectors 11 serving as basic units, and FIG. 11 illustrates the circuit of FIG. 10 in more detail. The selectors 31 in the first through third stages from the top of the figure are used to shift data right 0 to 7 bit positions, and the following three stages 32 are used to perform a left shift of 0 to 7 bit positions. The select signal RS causes the unselected one of the stages 31 and 32 to allow data to pass through as it is.

As noted above, to make a right or left shift in conventional shifters, separate right barrel shifters (such as indicated by 21 and 31) and left barrel shifters (such as indicated by 22 and 32) perform desired shifts. After the shift, depending on whether it is a right or left shift, the output of the right or left barrel shifter is selected. For this reason, conventional devices require more than twice as many selectors as those needed for the right or left barrel shifter. This increases the circuit size, and IC chip size.

Accordingly, the object of the present invention is to minimize the circuit size by reducing the number of selectors used in the right and left barrel shifter through common use of the selectors for a right and a left shift, on the condition that a right shift and left shift are not performed at the same time.

DISCLOSURE OF INVENTION

A bidirectional shifter according to the present invention comprises: a barrel shifter that is composed of an M×N matrix of selectors, M selectors arranged in the column direction according to the amount of shift and N selectors in the row direction according to the data length, and that is capable of performing a right or a left shift according to data indicating an amount of right or left shift; and data right/left reversing means provided at the input and output stages of the barrel shifter, respectively, which select input data according to a shift control signal.

Furthermore, a bidirectional shifter according to the present invention also comprises: a right or left cyclic shifter that supplies the data moved out of the right or left end of a barrel shifter to the selector at the left or right end, with the barrel shifter composed of an M×N matrix of selectors, M selectors arranged in the column direction according to the amount of shift and N selectors in the row direction according to the data length, and capable of performing a right or a left shift according to data indicating an amount of right or left shift; and a section for shifting data right or left by the 2'S complement of the data representing the amount of left or right shift in the shifter.

As noted above, the foregoing object of the present invention is accomplished by providing the following two types of bidirectional shifters:

A first bidirectional shifter in which a left (or right) shift is realized by adding data right/left reversing means to the input and output stages of the right (or left) barrel shifter, respectively, to perform an apparent right (or left) shift.

A second bidirectional shifter in which a cyclic shift function is added to each stage of the shifter, with which configuration, a left (or right) cyclic shift is equivalent to a right (or left) cyclic shift of the 2'S complement of the amount of shift.

DESCRIPTION OF THE PREFERRED EMBODIMENTS

Figure 12:
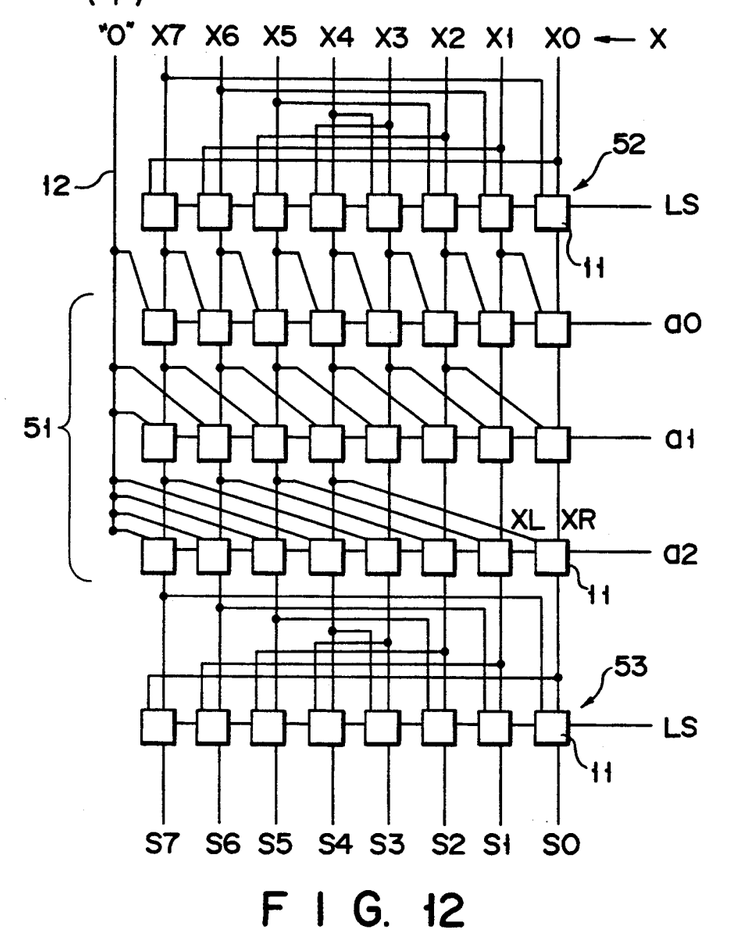
FIG. 12 is a block diagram of an embodiment of the present invention.
Figure 13:
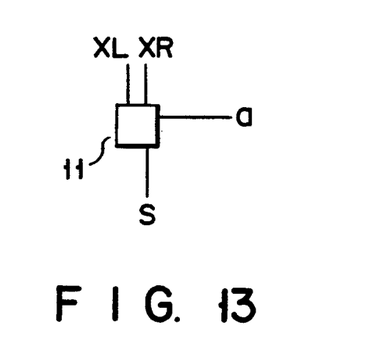
FIG. 13 is a block diagram of a portion of FIG. 12.
Figure 14:
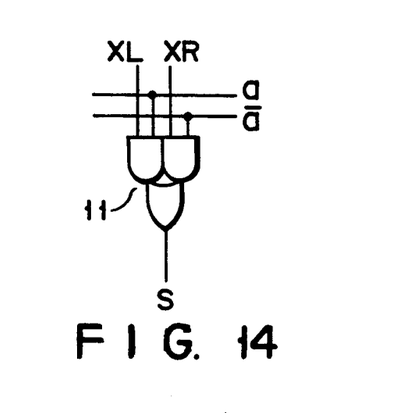
FIG. 14 is a circuit diagram of FIG. 13.

FIG. 12 a block diagram of an embodiment of the present invention, FIG. 13 a block diagram of a portion of FIG. 12, and FIG. 14 a circuit diagram of FIG. 13. In these figures, parts corresponding to those in the conventional shifters as described above are indicated by the same reference characters. Reference numeral 51 represents a barrel shifter that includes an M×N matrix of selectors, where M selectors (three in this case) are arranged in the column direction according to the amount of shift and N selectors (eight in this case) in the row direction according to the data length. This shifter is capable of performing a right shift according to data (a0–a2) representing the amount of right shift. Reference numerals 52 and 53 represent data right/left reversing means (eight bits, in this case) provided at the input stage and output stage, respectively.

Figure 15:
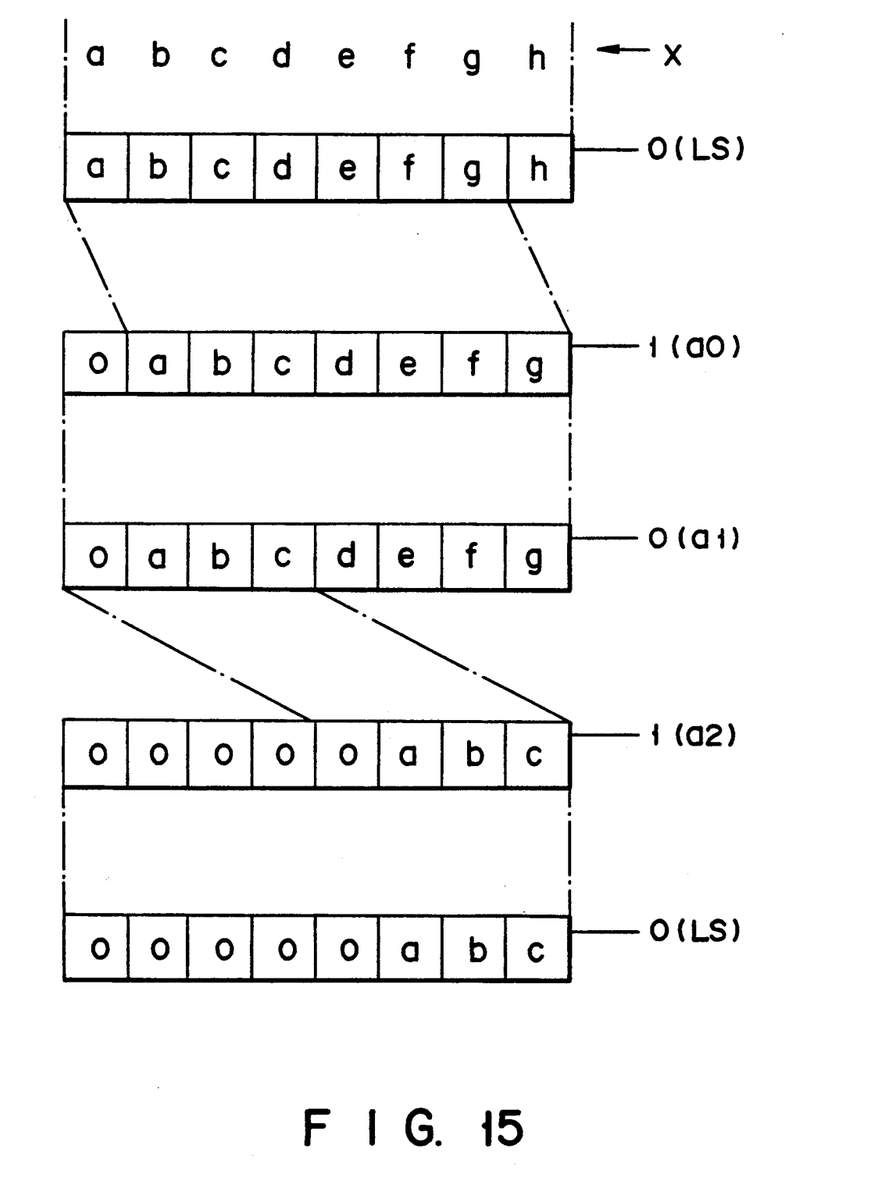
FIGS. 15 and 16 are explanatory diagrams for the operation of FIG. 12.

A right shift (a 5-bit right shift, in this case) in FIG. 12 will be explained below. The input data $X=x7-x0$, as shown in FIG. 15, is set to "a, b, c, d, e, f, g, h." Then, the amount of shift of 5 bit positions (control signal) is set to $a2=1$, $a1=0$, $a0=1$ in binary numbers. FIG. 15 illustrates how data is transferred (shifted) right 5 bit positions.

In a right shift, the left shift signal LS is a 0, and right/left reversing means 52 allows data to pass through downward without any change. After this, data is shifted right 1 bit position at the first stage of the barrel shifter 51, 0 bit position (i.e., no right shift) at the second stage, and 4 bit positions at the third stage, that is, a right shift of 5 bit positions in total is performed. Because the left shift signal is a 0, the right/left reversing means 53 does not reverse data from right (left) to left (right), permitting it to pass through without any change. As a result, the output s7–s0 of the 5-bit right shift produces the value "0, 0, 0, 0, 0, a, b, c" (refer to FIG. 15).

Figure 16:
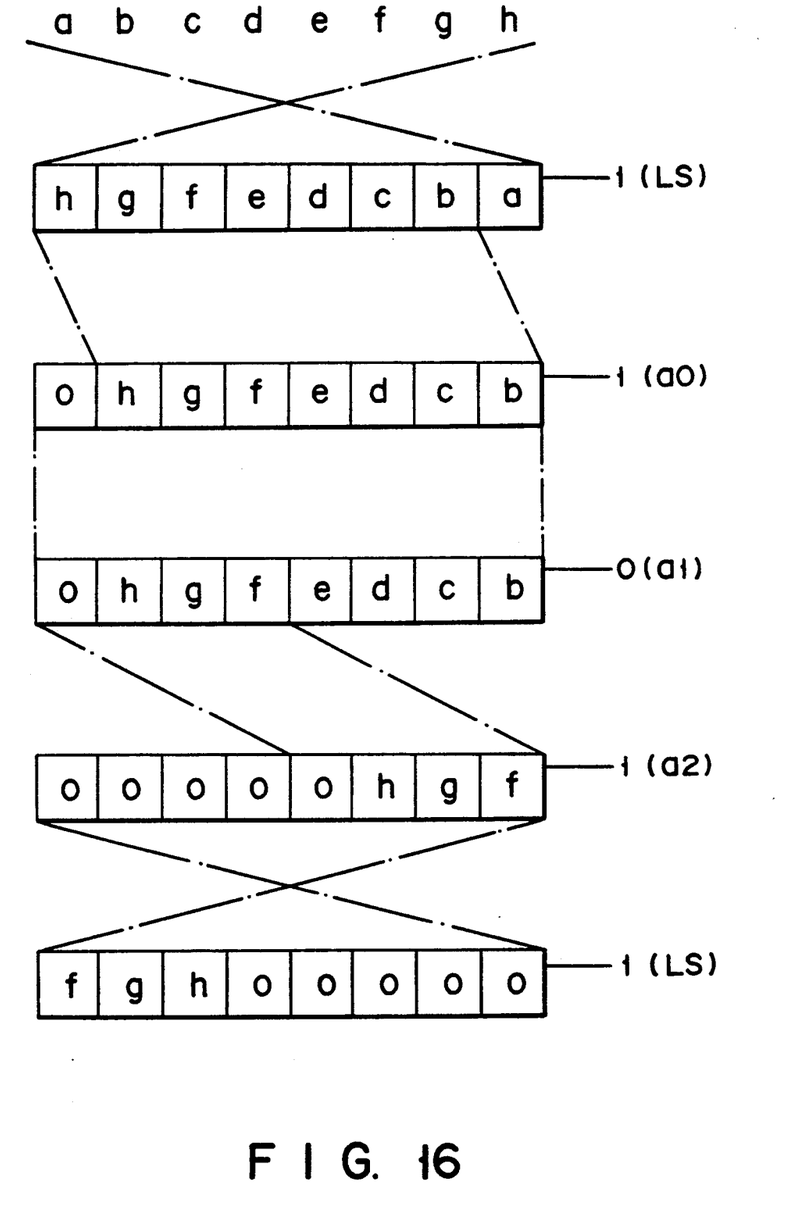

Now, a left shift (a left shift of 5 bit positions, in this case) in FIG. 12 will be explained. FIG. 16 shows how data is shifted left 5 bit positions. First, the first-stage shift signal LS goes to a 1, or LS=1, which causes data to be reversed from right to left. After this, a right shift of 5 bit positions is performed by means of the three-stage shifter 51. Specifically, data is shifted right 1 bit position according to $a0=1$ at the first stage, 0 bit according to $a1=0$ at the second stage, and 4 bit positions according to $a2=1$ at the third stage, that is, a right shift of 5 bit positions in total is performed. Because the left shift signal is a 1, the data is reversed from right to left, which causes the output s7–s0 to produce the left shifted data = f, g, h, 0, 0, 0, 0, 0.

Figure 17:
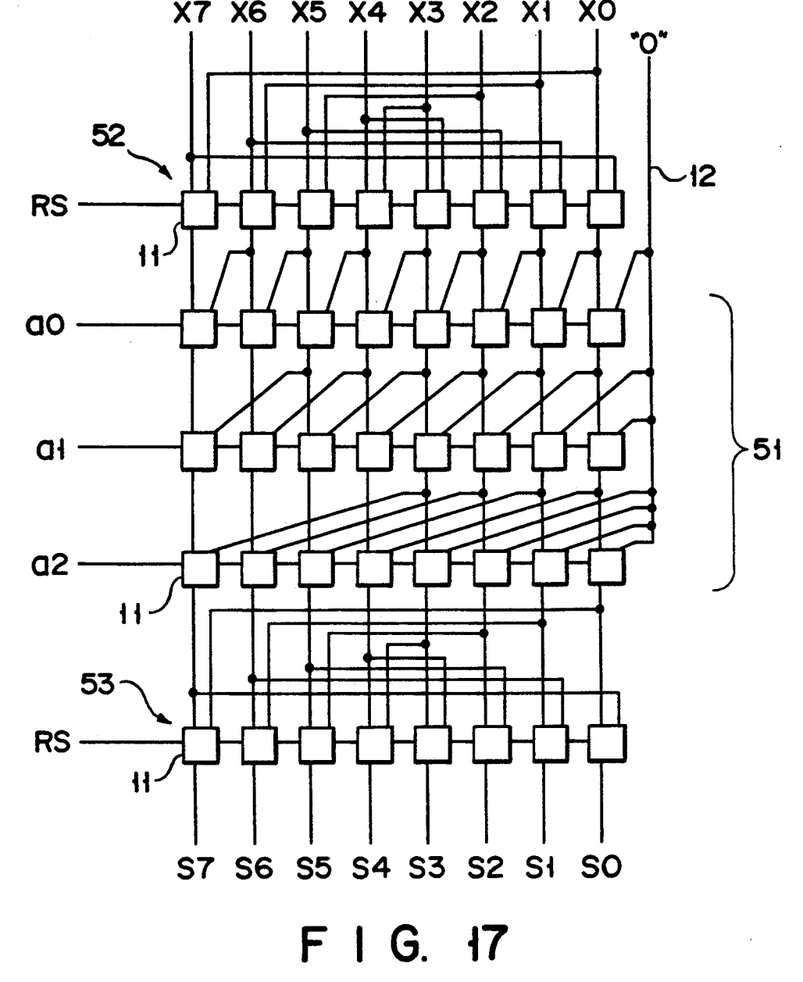
FIG. 17 is a block diagram of another embodiment of the present invention.
Figure 18:
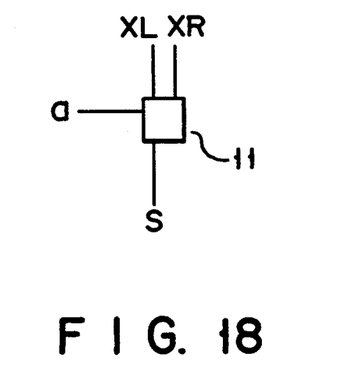
FIG. 18 is a block diagram of a portion of FIG. 17.
Figure 19:
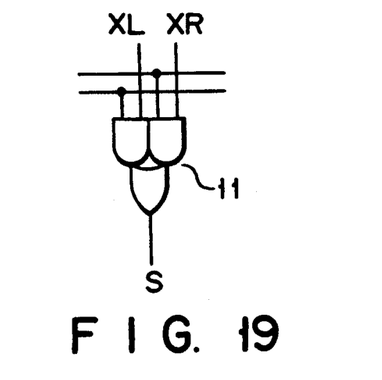
FIG. 19 is a circuit diagram of FIG. 18.

FIG. 17 shows a modification of FIG. 12, which is a bidirectional shifter using a barrel shifter capable of left shift. FIG. 18 is a detailed block diagram of a portion of FIG. 17 and FIG. 19 is a circuit diagram of FIG. 18. Because the circuit of FIG. 17 has a symmetrical relationship with that of FIG. 12, the descriptions in FIG. 12 applies equally to FIG. 17 if right and left are reversed.

Figure 20:
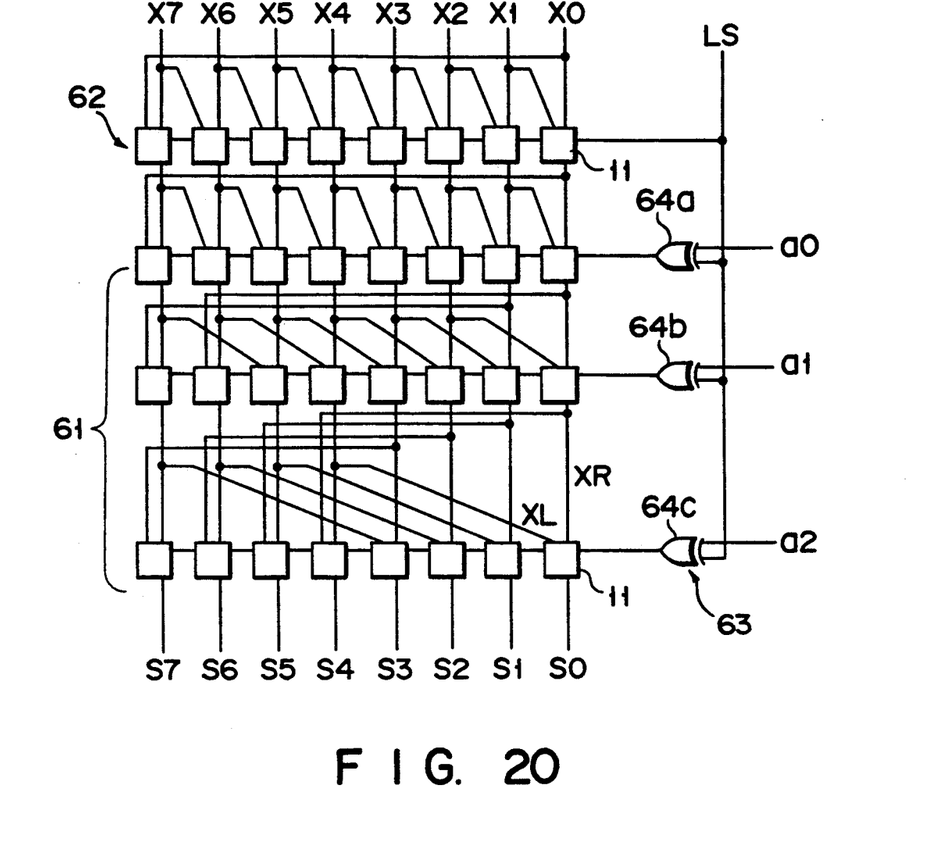
FIG. 20 is a block diagram of still another embodiment of the present invention.
Figure 21:
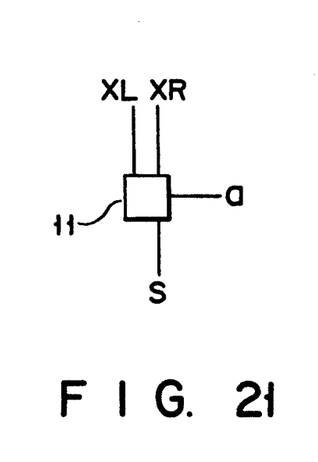
FIG. 21 is a block diagram of a portion of FIG. 20.
Figure 22:
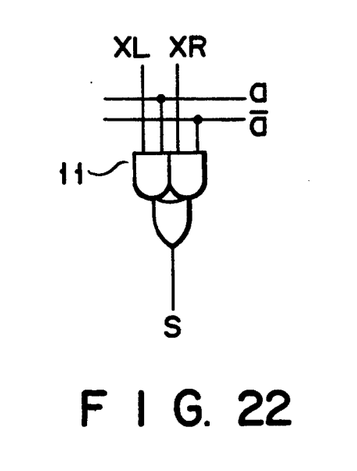
FIG. 22 is a circuit diagram of FIG. 21.

FIG. 20 shows another embodiment of the present invention, which uses the 2's complement of a binary number. FIG. 21 is a detailed block diagram of a portion of FIG. 20 and FIG. 22 is a circuit diagram of FIG. 21. For example, it is assumed that data (a0–a2) of 3 digits is shifted right 5 bit positions 101). Since the 2's complement of 101 is 3 (011), that is, reversal of each digit of 101 produces 010, adding 1 to it gives 011=3. In the present embodiment, because a left cyclic shift of 5 bit positions is equal to a right cyclic shift of the 2's complement of 5 (=3), a right cyclic shift of 3 bit positions is performed to produce the same result of a 5-bit left cyclic shift.

In FIG. 20, reference numeral 61 represents a section that shifts data according to the control signal a0–a2, reference numeral 62 represents a +1 circuit (performing a 1-bit right cyclic shift), and reference numeral 63 represents a section that reverses the control signal (101) to produce a signal (010). The shift section 61 performs a right cyclic shift of 1 bit position at the first stage, 2 bit positions at the second stage, and 4 bit positions at the third stage.

In FIG. 20, in a right cyclic shift, the left shift signal LS goes to a 0, or LS=0, the shifter 62 passes data through as it is. With the control signal a0–a2 (101 in this case) appearing as they are at the output of the exclusive OR 64a–64c, the three-stage shifter 61 carries out a right cyclic shift of 5 bit positions.

Figure 23:
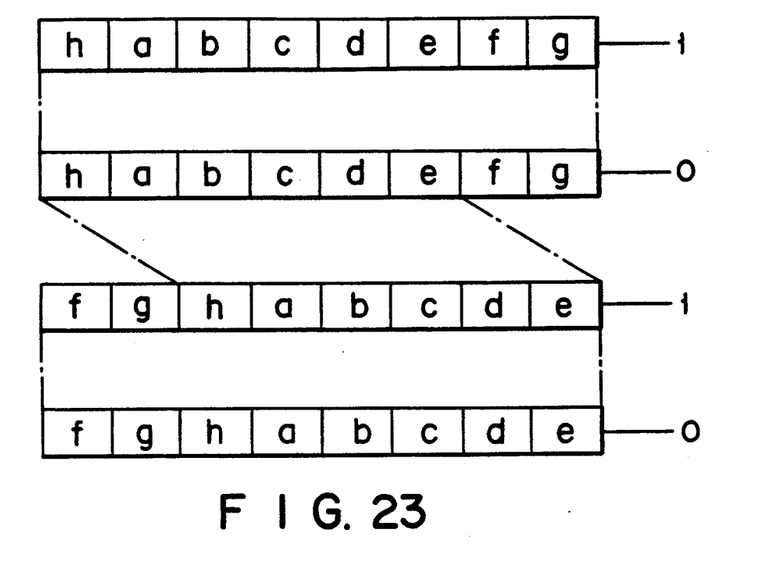
FIG. 23 is an explanatory diagram for the operation of FIG. 20.

Next, a left cyclic shift (for example, a left cyclic shift of 5 bit positions) will be described. FIG. 23 illustrates how data is transferred in a 5-bit left cyclic shift. First, the shifter 62, receiving the left shift signal LS=1, performs a right cyclic shift of 1 bit position. Then, the three-stage shifter 61 receives the reverse of a2, a1, a0=1, 0, 1, or the reversed data 010, from the gates 64a through 64c to carry out a right cyclic shift of 2 bit positions. Consequently, by performing a right cyclic shift of 3 bit positions, the 2s complement of 5 represented by the 3-bit data (a2—a0), a left cyclic shift of 5 bit positions is achieved.

Figure 24:
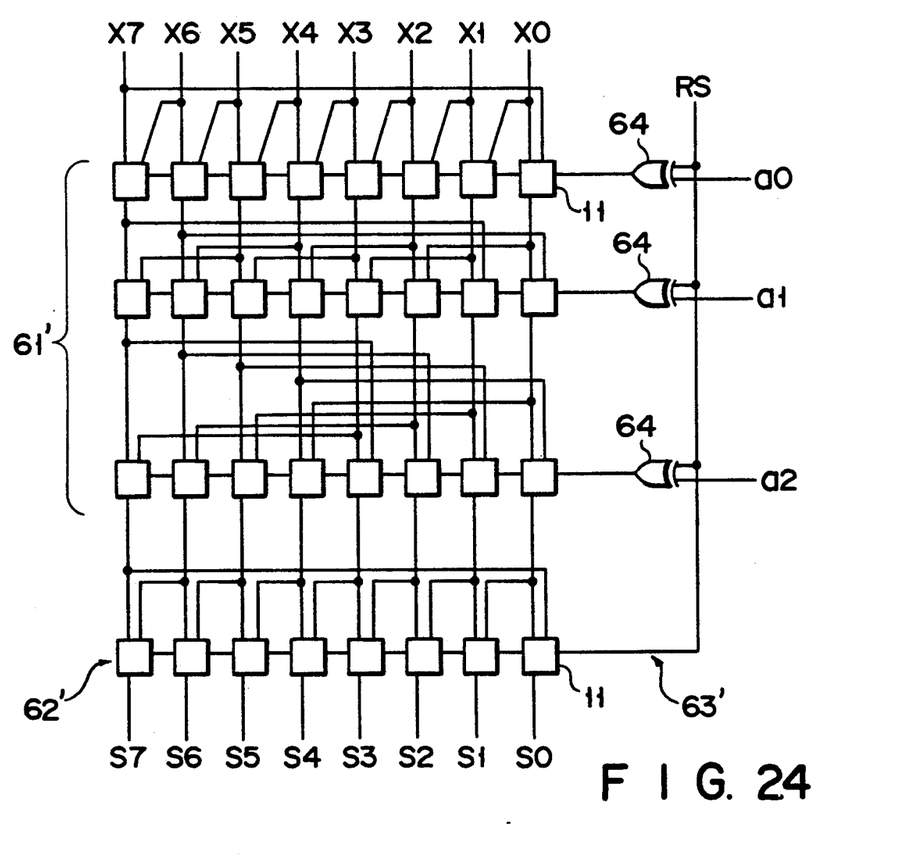
FIG. 24 is a block diagram of a further embodiment of the present invention.
Figure 25:
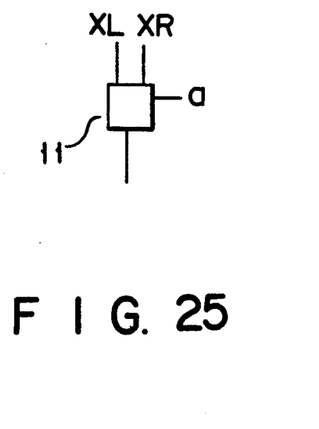
FIG. 25 is a block diagram of a portion of FIG. 24.
Figure 26:
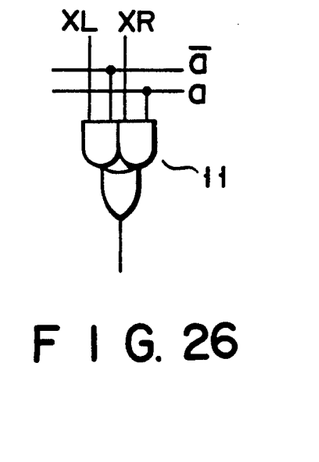
FIG. 26 is a circuit diagram of FIG. 25.
Figure 27:
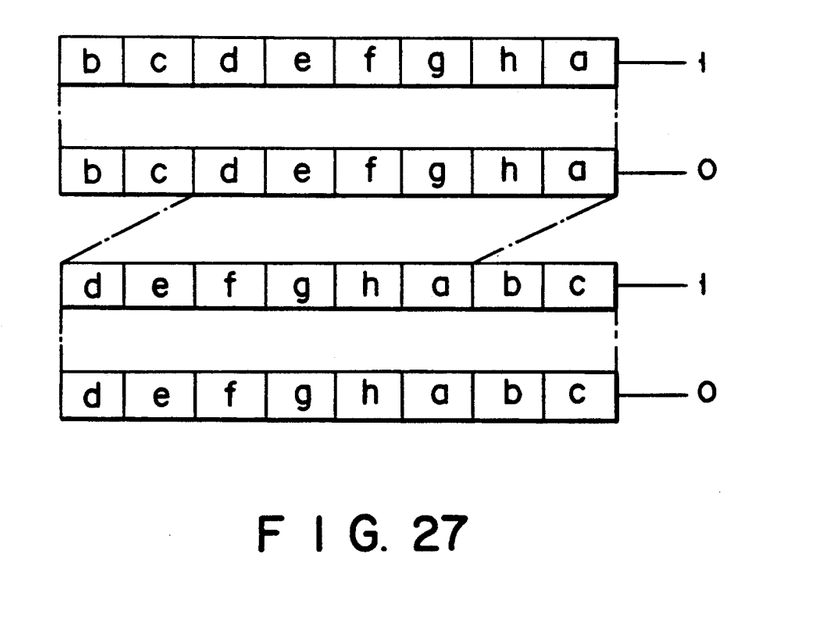
FIG. 27 is an explanatory diagram for the operation of FIG. 24.

FIG. 24 shows a bidirectional shifter using a left cyclic shifter, which is the reverse of FIG. 20. In the present embodiment, the arrangement is the same as that of FIG. 20 except that the right-left relationship is the reverse of that of FIG. 20, with the data a2—a0 indicating the same amount of shift. Therefore, corresponding parts in FIG. 20 are indicated by the same reference characters, which are followed by a superscript of an apostrophe. FIG. 27 illustrates how data is transferred when the left cyclic shifter of FIG. 24 is used for a right cyclic shift. Therefore, the right-left relationship in shift is the reverse of that in FIG. 23. In FIG. 24, a right shift signal RS is used and the +1 circuit 62' is placed in the final stage. As shown in FIGS. 25 and 26, the logic circuit to select data is the reverse of the previous embodiment.

Figure 28:
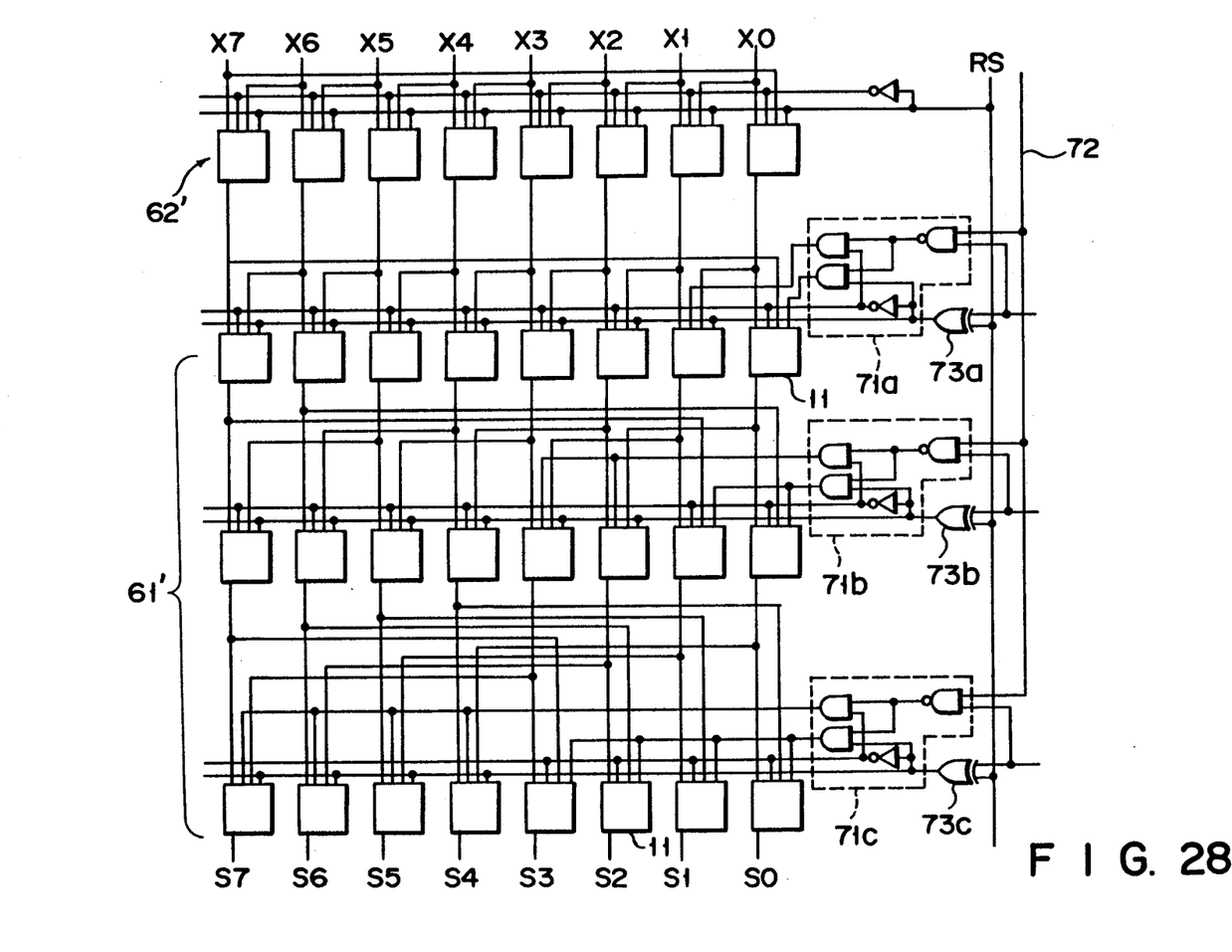
FIG. 28 is a block diagram of a still further embodiment of the present invention.
Figure 29:
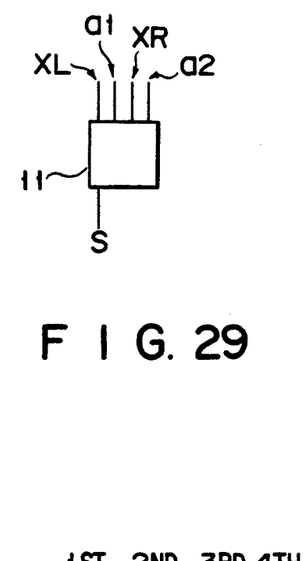
FIG. 29 is a block diagram of a portion of FIG. 28.
Figure 30:
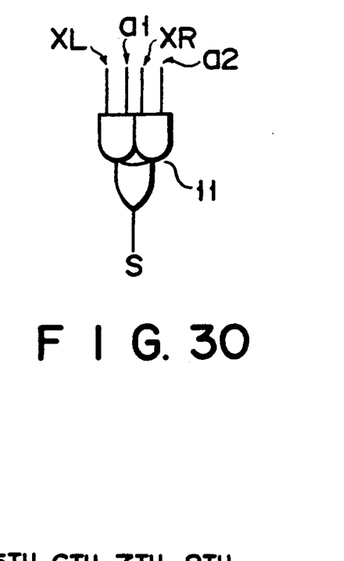
FIG. 30 is a circuit diagram of FIG. 29.

FIG. 28 shows still another embodiment of the present invention. FIG. 29 is a block diagram of a portion (a selector) of FIG. 28. FIG. 30 is a circuit diagram of FIG. 29. In the present embodiment, a bidirectional shifter is realized by providing the arrangement of FIG. 24 with the function of forcing each selector to be fixed at 0. Here, reference numerals 71a through 71c, represent select circuits that determine whether or not 0s are allowed to enter the selectors 11. When a1 and a2 are both 0s as shown in FIGS. 29 and 30, the selector output S will go to a 0 unconditionally. Reference numeral 72 represents a select section that chooses between a normal shift and a cyclic shift, and reference numerals 73a through 73c are select circuits that determine whether to perform a left shift or not.

Figure 31:
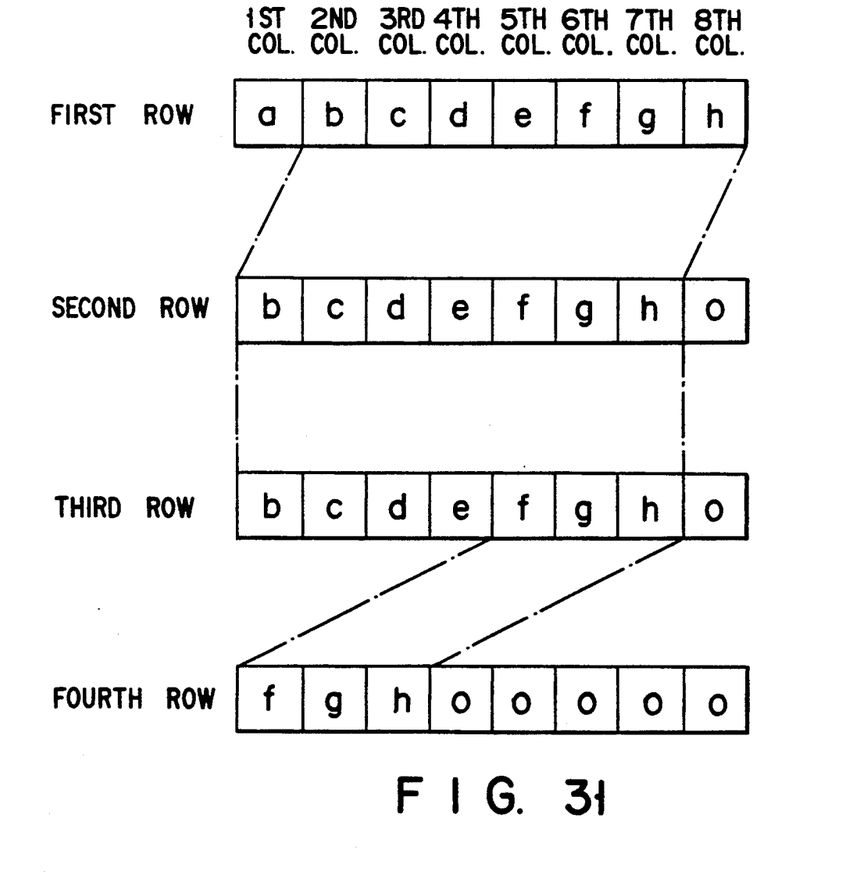
FIGS. 31 and 32 are explanatory diagrams for the operation of FIG. 28.

FIG. 31 illustrates how data is moved in a left shift of 5 bit positions in the circuit of FIG. 28. With the right shift signal RS=0, the shifter 61' at the first stage allows data to pass through. The second stage, receiving a 1-bit left shift signal from the circuit 71a, performs a left cyclic shift of 1 bit position on the data and at the same time, forces the selector at the second row and eighth column to output a 0. The third stage permits data to pass through as it is. The fourth stage (the fourth row) carries out a left cyclic shift of 4 bit positions on data and, at the same time, forces the selectors ranging from the fourth row and fifth column to the fourth row and eighth column to output 0s. As data passes through the 4-stage shifter, data is shifted left 5 bit positions.

Figure 32:
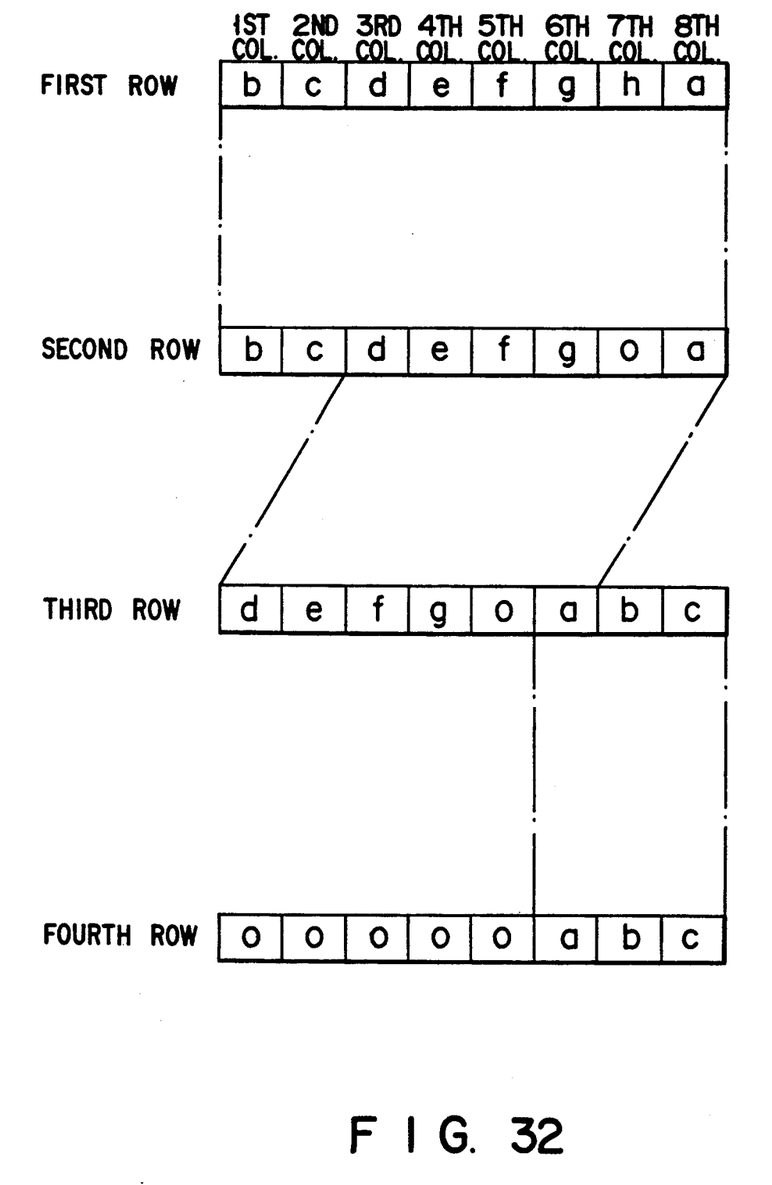

FIG. 32 illustrates how data is transferred in a right shift of 5 bit positions in the circuit of FIG. 28. With the right shift signal RS=1, the first stage performs a left cyclic shift of 1 bit position. Then, the second stage (the second row) performs a left cyclic shift of 0 bit positions on the data (that is, no shift) and at the same time, forces the selector at the second row and seventh column to output a 0 by using the output of circuit 71a. The third stage performs a left cyclic shift of 2 bit positions on the data. The fourth stage performs a left cyclic shift of 0 bit positions on the data (that is, no shift) and at the same time, forces the selectors ranging from the fourth row and first column to the fourth row and fourth column to output 0s. As the data passes through the 4-stage shifter as described above, the data is shifted right 5 bit positions. Reversing the right-left relationship in FIG. 28 provides a right shifter.

The present invention is not limited to the embodiments described above, and may be practiced or embodied in still other ways without departing from the spirit or scope of the invention. For instance, although the shifter in the embodiments has the unoccupied selectors after a shift fixed at 0s, could also be fixed at 1s.

As described above, according to the present invention, a common use of right and left selectors simplifies the construction, thereby making the IC chip smaller in size.

Bidirectional shifter according to the present invention are used for microcomputers and signal processing integrated circuits, especially DSP's, i.e., Digital Signal Processors.

I claim:

1. A shifter capable of performing a left and a right cyclic shift of input data, comprising:

a right cyclic barrel shifter having an M×N matrix of selectors, M selectors arranged in a column direction according to a maximum desired amount of shift, N selectors arranged in a row direction according to a maximum data length and being able to perform right cyclic shift according to shift amount data indicating an amount of right cyclic shift;

means for receiving the shift amount data, connected to each selector row of the barrel shifter;

an auxiliary right cyclic shifter connected to the barrel shifter, for shifting data right by one bit, before a right shifting operation of the barrel shifter when performing the left cyclic shift of the input data; and means, coupled to the shift amount data receiving means and the barrel shifter, for operating a plurality of selector rows of the barrel shifter in accordance with the shift amount data when performing the right cyclic shift of the input data and for operating the plurality of selector rows of the barrel shifter in accordance with a complement of the shift amount data when performing the left cyclic shift of the input data.

2. A shifter capable of performing a left and a right cyclic shift of input data, comprising:

a left cyclic barrel shifter having an M×N matrix of selectors, M selectors arranged in a column direction according to a maximum desired amount of shift, N selectors arranged in a row direction according to a maximum data length and being able to perform a left cyclic shift according to shift amount data data indicating an amount of left cyclic shift;

means for receiving the shift amount data, connected to each selector row of the barrel shifter, an auxiliary left cyclic shifter connected to the barrel shifter, for shifting data left by one bit, before a left shifting operation of the barrel shifter when performing the right cyclic shift of the input data; and means, coupled to the shift amount data receiving means and the barrel shifter, for operating a plurality of selector rows of the barrel shifter in accordance with the shift amount data when performing the left cyclic shift of the input data and for operating the plurality of selector rows of the barrel shifter in accordance with a complement of the shift amount data when performing the right cyclic shift of the input data.

* * * * *

UNITED STATES PATENT AND TRADEMARK OFFICE
CERTIFICATE OF CORRECTION

PATENT NO. : 5,262,971
DATED : November 16, 1993
INVENTOR(S) : Akira Yamaguchi

It is certified that error appears in the above-indentified patent and that said Letters Patent is hereby corrected as shown below:

TITLE PAGE

Abstract, line 2, change "(52)" to --(51)--.

Signed and Sealed this

Twenty-third Day of August, 1994

Attest:

BRUCE LEHMAN

Attesting Officer  Commissioner of Patents and Trademarks